United States Patent [19]

Nishie et al.

[11] Patent Number: 4,487,474

[45] Date of Patent: Dec. 11, 1984

[54] OPTICAL CONNECTOR WITH CERAMIC PLUGS AND SLEEVE

[75] Inventors: Mitsuaki Nishie; Satoru Iguchi; Ichiro Kono, all of Kanagawa, Japan

[73] Assignee: Sumitomo Electric Industries, Ltd., Osaka, Japan

[21] Appl. No.: 280,043

[22] Filed: Jul. 6, 1981

[30] Foreign Application Priority Data

| | | | |
|---|---|---|---|
| Jul. 8, 1980 | [JP] | Japan | 55-95179[U] |
| Jul. 8, 1980 | [JP] | Japan | 55-95181[U] |
| Jul. 8, 1980 | [JP] | Japan | 55-92219[U] |
| Jul. 10, 1980 | [JP] | Japan | 55-96192[U] |

[51] Int. Cl.³ .............................................. G02B 7/26
[52] U.S. Cl. .................................. 350/96.21; 350/96.20
[58] Field of Search ................ 350/96.20, 96.21, 96.22

[56] References Cited

U.S. PATENT DOCUMENTS

| | | | |
|---|---|---|---|
| 4,132,461 | 1/1979 | Jacques et al. | 350/96.20 |
| 4,361,380 | 11/1982 | Marazzi | 350/96.21 |
| 4,371,233 | 2/1983 | Masuda | 350/96.18 |

FOREIGN PATENT DOCUMENTS

| | | | |
|---|---|---|---|
| 2549484 | 5/1976 | Fed. Rep. of Germany | 350/96.21 |
| 8835 | 1/1977 | Japan | 350/96.21 |
| 26143 | 3/1978 | Japan | 350/96.21 |
| 116943 | 9/1979 | Japan | 350/96.21 |

OTHER PUBLICATIONS

Suzuki et al., "Ceramic Capillary Connector for 1.3 μm Single-Mode Fibres," *Electron. Lett.*, vol. 15, No. 25, Dec. 1979, pp. 809-810.

Mossman, "Ceramic Components for Optical-Fibre Systems," *Electron. Lett.*, vol. 17, No. 13, Jun. 1981, pp. 451-452.

Primary Examiner—John Lee
Attorney, Agent, or Firm—Sughrue, Mion, Zinn, Macpeak & Seas

[57] ABSTRACT

An optical connector in which a pair of ceramic optical plugs having optical fibers extending coaxially therethrough are fitted within a ceramic sleeve. In one embodiment, an inner surface of the sleeve is provided with a longitudinal groove extending from one end of the sleeve to the other so that air and dust will be expelled from the sleeve when plugs are inserted therein. A housing may be provided around the sleeve with a flange being formed on the housing. In another embodiment, a protective cover is provided surrounding each plug which is movable axially along the plug.

3 Claims, 8 Drawing Figures

OPTICAL CONNECTOR WITH CERAMIC PLUGS AND SLEEVE

BACKGROUND OF THE INVENTION

The present invention relates to an improved optical connector sleeve which is used for detachably connecting optical fibers.

With the recent progress of research and development on optical fibers, optical communication systems are finding increasing use. Often optical fibers must be connected. When connecting optical fibers, it is necessary to ensure that transmission loss at joints be reduced as far as possible. When a detachable optical connector is used, it is particularly important to connect the optical fibers without misalignment therebetween. For this purpose, it has been customary to employ a connector sleeve formed precisely from stainless steel or other metals. This sleeve is in the form of a cylinder having an inside diameter which is substantially equal to the outside diameter of a plug having an optical fiber attached thereto so that the plug may be precisely fitted into the sleeve. Since the sleeve is made of a metal, however, it gradually wears as it is repeatedly used for detachable connection. Moreover, a gap may be formed between the sleeve and the plug due to thermal expansion causing misalignment between the optical fibers.

These problems bring about an increase in transmission loss in the sleeve. It has therefore been proposed to use instead of a metal sleeve a sleeve made of ceramic material which has a higher wear resistance and is less subject to thermal expansion than a metal sleeve. The use of ceramic material also has the advantage of facilitating the manufacture of a sleeve with a high degree of dimensional accuracy.

Such a ceramic sleeve, however, still involves a problem. Referring to FIG. 1 of the drawings, there is shown a known ceramic sleeve 3 in which a plug 4 having an optical fiber 1 attached thereto is mounted. If another plug 2 carrying another optical fiber 1 is inserted into the sleeve 3, as shown in FIG. 1, for connecting the two optical fibers 1, the two plugs 2 and 4 fit into the sleeve 3 so tightly that the air in the interior 3a of the sleeve 3 has no place to escape. The air which is compressed between the plugs prevents smooth connection in the sleeve 3. Moreover, any dust trapped in the sleeve 3 or adhering to the plug 2 is also confined inside the sleeve 3 thus further inhibiting smooth connection. Any dust prevent on the end of a fiber can also bring about an increase in transmission loss in the sleeve.

Under there circumstances, it is an object of this invention to provide an improved precisely formed ceramic optical connector sleeve which can connect optical fibers in such a way that there is essentially no transmission loss therebetween, and to provide a ceramic sleeve which permits easy connection of optical fibers.

SUMMARY OF THE INVENTION

According to this invention, this object is attained by a ceramic sleeve having an inner surface provided with a longitudinal groove extending from one end to the other. In accordance with the invention, a pair of plugs having optical fibers secured coaxially thereto are inserted into opposite ends of a ceramic sleeve in a receptacle for connecting optical fibers.

Further in accordance with the invention, there is provided a plug assembly including a ceramic plug supported at a rear end thereof on the front end of a plug support with an opticl fiber extending coaxially of the plug support and plug, terminating at the front end of the plug. A rotary ring encircles the plug support and a coupling nut is rotatably mounted on the rotary ring with the coupling nut having an outer peripheral surface provided with a front end stop projection and a rear end stop projection. The coupling nut is internally threaded for connection to a receptacle. A cylindrical protective cover having a radially inwardly projecting flange at its rear end is movable axially over the coupling nut. A spacer is provided between the coupling nut and the protective cover.

DESCRIPTION OF THE PREFERRED EMBODIMENTS

Figure 1:
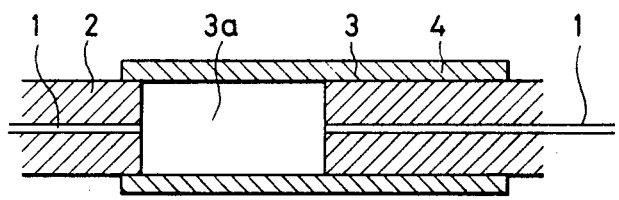
FIG. 1 is a longitudinal sectional view of a known optical connector sleeve.

The invention will now be described in detail by way of example with reference to the drawings, in which like numerals are used to indicate like parts both in FIG. 1 (prior art) and in FIG. 2.

A sleeve 3, constructed in accordance with the present invention, is precisely formed from ceramic material and has a precisely finished inner surface which allows a plug, which may be made of either ceramic material or metal, to be snugly fitted into the sleeve. This arrangement permits an optical fiber on the plug to be properly aligned with another optical fiber on another plug in the sleeve so that there is no appreciable transmission loss therebetween.

Figure 2:
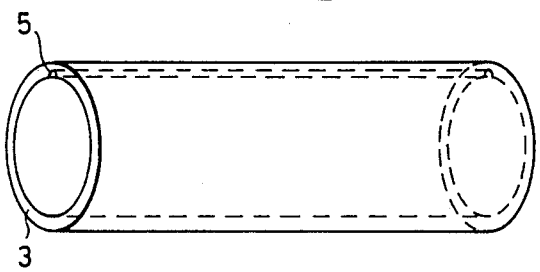
FIG. 2 is a perspective view of a ceramic optical connector sleeve constructed in accordance with the invention in which a longitudinal section is shown by broken lines.

The inner surface of the sleeve 3 is provided with a longitudinal groove 5 extending from one end of the sleeve to the other as shown in FIG. 2. The groove 5 provides a passage through which air, dust or the like can be expelled from the sleeve 3 when the plug is inserted thereinto. Although FIG. 2 shows the groove 5 having a U-shaped cross section, it may be of any other shape so long as it permits the expulsion of air or the like from the sleeve 3.

The precisely finished ceramic sleeve of the invention permits connection of optical fibers in proper alignment with each other so that there is no substantial transmission loss therebetween. The sleeve permits easy and smooth connection of optical fibers as the groove permits expulsion of any excess air from the sleeve. Since the groove also allows for expulsion of any dust from the sleeve or the outer periphery of the plug, any increase in transmission loss that would otherwise result from dust adhering to the ends of the fibers is prevented. Moreover, the ceramic sleeve of the invention has an improved degree of wear resistance, is little affected by thermal expansion, and is easy to make in a precisely finished form.

Figure 3:
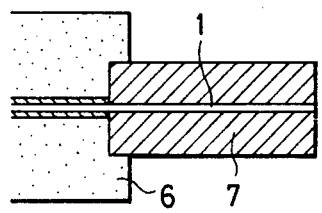
FIG. 3 is a fragmentary longitudinal sectional view of an optical connector embodying the invention, and particularly, a plug employed therein.
Figure 4:
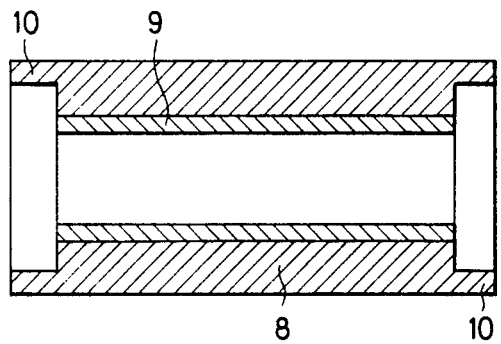
FIG. 4 is a longitudinal sectional view of a receptacle shown in FIG. 3.
Figure 5:
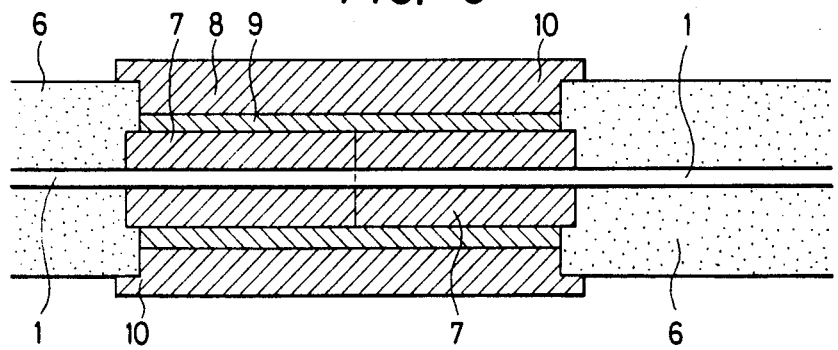
FIG. 5 is a longitudinal sectional view of the optical connector of FIG. 3 in its connected position.

Another embodiment of an optical connector of the invention is shown in FIGS. 3-5. Referring to FIG. 3, there is shown a plug 7 having a rear end supported on the front end of a plug support 6 through which an optical fiber 1 extends. The plug 7 is formed from ceramic material, which has a higher degree of wear resistance and a lower coefficient of thermal expansion than stainless steel or other metals. The optical fiber 1, which projects from the plug support 6, extends through the plug 7 coaxially therewith and terminates at its front end.

FIG. 4 shows a receptacle which includes a cylindrical housing 8, and a sleeve 9 fitted in the housing 8. The sleeve 9 is formed from ceramic material. The sleeve 9 has an inside diameter which is substantially equal to the outside diameter of the plug 7 so that the plug 7 may be fitted tightly in the sleeve 9 without leaving any clearance therebetween. The housing 8 has at each end thereof an engaging portion 10 which is engageable with the plug support 6.

Referring now to FIG. 5 there is shown a complete optical connector composed of two such plugs 7 joined together in the receptacle. When the connector is assembled, the plugs 7 are inserted into the sleeve 9 at the opposite ends thereof with the plugs abutting each other at their front faces. Since the optical fibers 1 extend through the center of the plugs 7 which are fitted tightly in the sleeve 9, the optical fibers 1 are properly aligned with each other at the abutting ends of the plugs 7. Since the plugs 7 and the sleeve 9 are made of ceramic material, they can be repeatedly connected to and disconnected from each other without any appreciable wear and any objectionable misalignment of the optical fibers 1. Moreover, as ceramic material has a low coefficient of thermal expansion, neither the plugs 7 nor the sleeve 9 undergoes any thermal deformation that might result in misalignment of the optical fibers 1. Although ceramic material is generally considered to have a low impact strength, the ceramic plugs or sleeve may be partially broken without affecting the proper performance of the connector. On the other hand, stainless steel or other metal plugs or sleeves may undergo plastic deformation and fail to accomplish proper connection if external force is applied thereto.

Moreover, as ceramic material is easy to manufacture on a mass-production basis, the connector of the invention is less expensive to manufacture than known metal connectors. Furthermore, the plugs 7 and the sleeve 9 in the optical connector of the invention, which are both made of ceramic material, can be connected with each other very smoothly and snugly.

Figure 6:
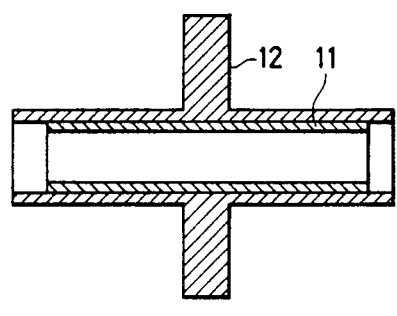
FIG. 6 shows a longitudinal sectional view of a receptacle in an optical fiber connector of another embodiment of the invention.

Referring to FIG. 6, another optical fiber connector according to the invention includes a ceramic sleeve 11 which is finished highly precisely by grinding, lapping, or otherwise, and in which plugs (not shown) can be tightly fitted. The sleeve 11 is fitted in a housing 12 to form a receptacle for plugs and optical fibers. The housing is formed with an integral flange. Ceramic material is by far easier to work upon than metals, and provides higher productivity if it is fired before it is sintered to obtain its final properties. According to this invention, therefore, the receptacle can be manufactured inexpensively.

The optical fiber connector of the invention, which employs a ceramic sleeve, has an improved degree of wear resistance and is less affected by heat. Therefore, it can maintain a satisfactorily low level of transmission loss for a long time. The use of ceramic material has also the advantage of facilitating precision forming of the sleeve.

Figure 7:
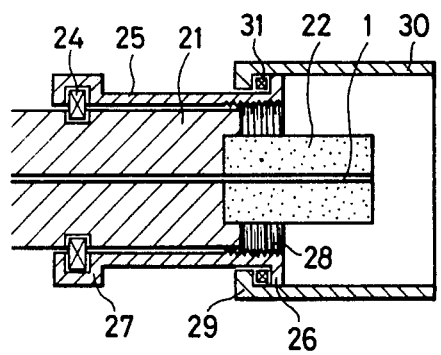
FIG. 7 is a longitudinal sectional view showing a plug and protective cover combination in an optical connector plug assembly of still a further embodiment of the invention.

Referring next to FIG. 7, there is shown in a longitudinal sectional view yet another preferred embodiment of a plug assembly of the invention. A ceramic plug 22 has a rear end supported on the front end of a plug support 21. An optical fiber 1 extends coaxially through the plug support 21 and the plug 22 and terminates at the front end of the plug 22. The plug 22 has an outer peripheral surface and an end surface which are precisely finished. A rotary ring 24 encircles the plug support 21 and is fitted in the outer peripheral surface thereof. A coupling nut 25 is rotatably mounted around the rotary ring 24. The coupling nut 25 has an outer peripheral surface provided with a front end stop projection 26 and a rear end stop projection 27. The rotary ring 24 is positioned behind the rear end stop projection 27. The coupling nut 25 is internally threaded at 28 for connection to a receptacle. A cylindrical protective cover 30 having a radially inwardly projecting flange 29 at its rear end is fitted axially movably over the coupling nut 25. The flange 29 on the cover 30, which is movable between the stop projections 26 and 27 on the coupling nut 25, is engageable therewith to prevent detachment of the protective cover 30 from the coupling nut 25. A spacer 31 is provided between the coupling nut 25 and the protective cover 30.

The protective cover 30 is maintained at its advanced position to surround and protect the plug 22, as shown in FIG. 7, until connection to another plug and cover combination of identical construction. When the cover 30 is in its advanced position, the flange 29 is in its closest position to the stop projection 26 on the coupling nut 25 with the spacer 31 therebetween.

Figure 8:
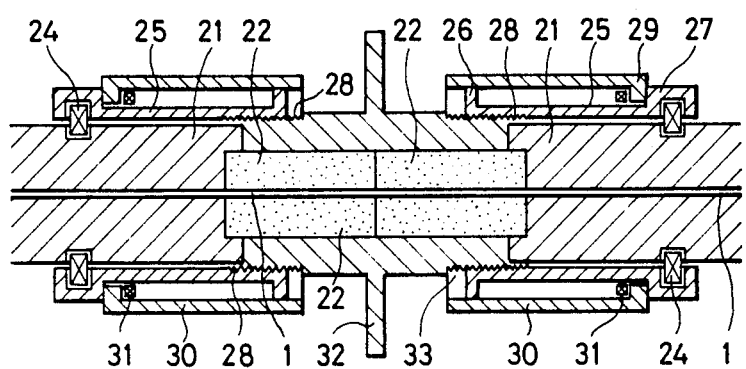
FIG. 8 is a longitudinal sectional view of a joined connector-plug assembly.

When it is desired to connect two plugs, the protective covers 30 are moved back into their retracted positions to expose the plugs 22, and the plugs 22 are inserted into the receptacle 32 at opposite ends until the front ends of the plugs 22 abut each other, as shown in FIG. 8. The receptacle 32 is externally threaded at both ends as shown at 33, and the coupling nuts 25 are threadedly connected over the ends of the receptacle 32 to join the plugs 22 to each other.

As is evidenced from the foregoing description, the optical connector plug assembly of the invention includes ceramic plugs and protective covers therefor which are axially movable along the plugs. The protective covers surround and protect the plugs against any impact thereon until the plugs are connected to each other. When the plugs are joined to each other, the protective covers are retracted so that they cannot interfere with the connection of the plugs.

According to the embodiments shown in FIGS. 7 and 8, optical connection is achieved by means of threads. However, another type of connection is achievable in employing the ceramic sleeve, for example, bayonet-lock (BNC-connector).

What is claimed is:

1. An optical connector comprising: a ceramic plug; a plug support, a rear end of said ceramic plug being supported on a front end of said plug support, an optical fiber extending coaxially through said plug support and said ceramic plug terminating at a front end of said ceramic plug; a rotary ring disposed around said plug support fitted in an outer peripheral surface of said plug support; a coupling nut rotatably mounted around said rotary ring, said coupling nut having an outer peripheral surface provided with a front end stop projection and a rear end stop projection, said rotary ring being positioned behind said rear end stop projection, and said coupling nut being internally threaded for connection to a receptacle; a cylindrical protective cover having a radially inwardly projecting flange at its rear end, said protective cover being axially movable over said coupling nut; and a spacer provided between said coupling nut and said protective cover.

2. The optical connector of claim 1 further comprising a receptacle threaded to receive a coupling nut at opposed ends thereof and having a hollow portion for receiving one said ceramic plug at each end thereof, ceramic plug having ends abutting each other when coupled to said receptacle.

3. The optical connector of claim 1 wherein said receptacle has an inner peripheral surface formed with a groove extending along an axial direction thereof over the entire length of said receptacle.

* * * * *